United States Patent [19]

Shiiki et al.

[11] 4,451,640

[45] May 29, 1984

[54] PROCESS FOR PRODUCING AROMATIC SULFIDE POLYMER

[75] Inventors: Zenya Shiiki; Yukichika Kawakami, both of Iwaki, Japan

[73] Assignee: Kureha Kagaku Kogyo Kabushiki Kaisha, Tokyo, Japan

[21] Appl. No.: 532,759

[22] Filed: Sep. 16, 1983

Related U.S. Application Data

[63] Continuation-in-part of Ser. No. 435,214, Oct. 19, 1982.

[30] Foreign Application Priority Data

Oct. 20, 1981 [JP] Japan .................................. 56-167573

[51] Int. Cl.$^3$ .............................................. C08G 12/20
[52] U.S. Cl. ...................................... 528/265; 528/232; 528/239; 528/389; 528/388; 528/243; 528/244; 528/242
[58] Field of Search ............... 528/232, 239, 265, 389, 528/243, 244, 242, 388

[56] References Cited

U.S. PATENT DOCUMENTS

| 2,538,941 | 1/1951 | Macallum | 528/387 |
| 3,878,176 | 4/1975 | Moberly | 528/389 |
| 3,884,884 | 5/1975 | Scoggins et al. | 528/389 |
| 3,919,177 | 1/1975 | Campbell | 528/389 |

OTHER PUBLICATIONS

Chemical Abstracts, vol. 89, No. 14 (1978), p. 41, No. 110920v.

*Primary Examiner*—Melvyn I. Marquis
*Attorney, Agent, or Firm*—Finnegan, Henderson, Farabow, Garrett & Dunner

[57] ABSTRACT

Disclosed herein is a process for producing an aromatic sulfide polymer, comprising the step of reacting elementary sulfur, a polyhalogen-substituted aromatic compound, an aldehyde or a condensate thereof and a caustic alkali in an organic solvent.

6 Claims, No Drawings

PROCESS FOR PRODUCING AROMATIC SULFIDE POLYMER

CROSS-REFERENCE TO RELATED APPLICATION

This application is a continuation-in-part of U.S. patent application Ser. No. 435,214, filed Oct. 19, 1982.

SUMMARY OF THE INVENTION

In an aspect of the present invention, there is provided a process for producing an aromatic sulfide polymer, comprising the step of reacting one gram-equivalent of elementary sulfur, 0.7 to 1.3 gram-equivalents of a polyhalogen-substituted aromatic compound, 0.6 to 1.4 gram-equivalents of an aldehyde or a condensate thereof and 1.2 to 2.5 gram-equivalents of a caustic alkali in 0.02 to 5 liters of an organic solvent at a temperature of 100° to 300° C.

BACKGROUND OF THE INVENTION

The present invention relates to a process for producing an aromatic sulfide polymer comprising utilizing elementary sulfur as a source of sulfur in the product. More in detail, the present invention relates to a process for producing the aromatic sulfide polymer, comprising the step of reacting elementary sulfur, a polyhalogen-substituted aromatic compound, an aldehyde or a condensate thereof and a caustic alkali in an organic solvent, and more particularly relates to a process for producing an aromatic sulfide polymer, comprising the step of reacting one gram-equivalent of elementary sulfur, 0.7 to 1.3 gram-equivalents of a polyhalogen-substituted aromatic compound, 0.6 to 1.4 gram-equivalents of an aldehyde or a condensate thereof and 1.2 to 2.5 gram-equivalents of a caustic alkali in 0.02 to 5 liters of an organic solvent at a temperature of 100° to 300° C., wherein elementary sulfur and the polyhalogen-substituted aromatic compound react to form the main chain of the polymer, the aldehyde or the condensate thereof acts as a reductant to scavenge oxygen generated in the reaction and the caustic alkali acts as a scavenger of carbon dioxide generated in the reaction.

Thermoplastic resins having a high thermal resistance have come to be more and more demanded as a material for mechanical parts and electronic machinery parts, and the aromatic sulfide polymer is one of such thermoplastic resins which can respond to such a demand.

As a process for producing the aromatic sulfide polymer comprising utilizing elementary sulfur as it is as the most inexpensive raw material for sulfur in the polymer, for instance, the following processes have been known.

(1) A process wherein elementary sulfur, dichlorobenzene and an inorganic base such as sodium carbonate are reacted into molten form without using any solvent (refer to U.S. Pat. Nos. 2,513,188 and 2,538,914) and, (2) A process wherein elementary sulfur, polyhalogen-substituted aromatic compound and an inorganic base such as sodium hydroxide are reacted in a polar solvent (refer to U.S. Pat. No. 3,878,176).

According to the result of the present inventors' studies on the conventional process mentioned above, a stoichiometrical amount of oxygen is produced according to the following formulae in the reaction.

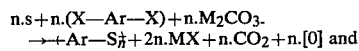

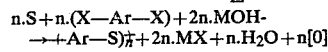

wherein X, Ar, M and n represent respectively a halogen atom, an aromatic ring, an atom of alkali metal and the degree of polymerization of the aromatic sulfide polymer.

It is considered that oxygen generated from the metal carbonate according to the formulae reacts with elementary sulfur, sulfur atom(s) bonded to the terminal part and the inner part of the polymer, and hydrogen atom(s) bonded to the molecules of the polymer or the solvent, etc. to cause side reactions, for instance, oxidation, hydrogen-pull reaction, cyclization by condensation, etc. of the reactants and the solvent in the reaction system and other secondary reactions accompanying with the above-mentioned reactions, thus resulting in the inhibition of the smooth proceeding of polymerization, the formation of pitch-like material from the polymer and the carbonization of the polymer.

Consequently, in the conventional process for producing the polymer, due to the inhibition of the normal proceeding of polymerization by the oxygen, there are various demerits such as (i) the low yield and low-molecular weight of the polymer (ii) the fear of formation of pitch-like material from the polymer and carbonization of the polymer, in some cases, etc. resulting in the difficulty of obtaining a practically usable aromatic sulfide polymer in view of the physical properties thereof.

In addition, in the case where a metal carbonate is used as the inorganic base according to the conventional process mentioned above, also a stoichiometrical amount of carbon dioxide is produced in the reaction system, which seems also to inhibit the normal proceeding of polymerization, thus giving a low yield of the polymer.

As a process for producing the aromatic sulfide polymer, other than the process of utilizing elementary sulfur, the process of using an alkalimetal sulfide, particularly sodium sulfide nonahydrate as the source of sulfur has been disclosed (refer to U.S. Pat. Nos. 3,354,129 and 3,919,177) and the method has a demerit of necessitating a troublesome step of removing a part of water of crystallization of the nonahydrate. However, when anhydrous potassium sulfide was used instead of partially dehydrated sodium sulfide nonahydrate by the present inventors according to the above-mentioned disclosure, the aromatic sulfide polymer was scarcely obtained.

In the present inventors' studies for a means of solving the above-mentioned demerits of the conventional processes for producing the aromatic sulfide polymer, it has been found by the present inventors that the co-existence of an aldehyde or a condensate thereof as a suitable reductant, a caustic alkali as a scavenger of carbon dioxide in the reaction system comprising elementary sulfur and a polyhalogen-substituted aromatic compound in an organic solvent are quite effective in removing oxygen and carbon dioxide which are generated in the reaction system without necessitating any troublesome operation, thus resulting in the smooth and speedy proceeding of the polymerization which gives the aromatic sulfide polymer suitably high in molecular weight for the purpose in a favorable yield.

The present invention has been attained on the basis of the above-mentioned findings.

DETAILED DESCRIPTION OF THE INVENTION

The present invention relates a process for producing an aromatic sulfide polymer, comprising the step of reacting elementary sulfur as the source of sulfur in the polymer, a polyhalogen-substituted aromatic compound as the source of the basic constituent of the polymer, an aldehyde or a condensate thereof as a reductant of the generating oxygen and a caustic alkali as a scavenger of the generating carbon dioxde in an organic solvent, thereby carrying out the production of the polymer while preventing the detrimental reactions caused by the oxygen and the carbon dioxide, and more particularly relates to a process for producing an aromatic sulfide polymer, comprising the step of reacting one gram-equivalent of elementary sulfur, 0.7 to 1.3 gram-equivalents of a polyhalogen-substituted aromatic compound, 0.6 to 1.4 gram-equivalents of an aldehyde or a condensate thereof and 1.2 to 2.5 gram-equivalents of a caustic alkali in 0.02 to 5 liters of an organic solvent at a temperature of 100° to 300° C.

The principal mechanism of the process for producing the aromatic sulfide polymer according to the present invention (hereinafter referred to as "the present process") is presumed to be as follows.

(i) In the case where paraformaldehyde is used as a condensate of an aldehyde (formaldehyde):

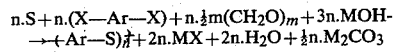

(ii) In the case where paraacetaldehyde is used as a condensate of an aldehyde (acetaldehyde):

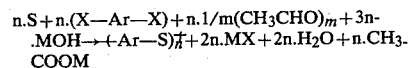

wherein Ar, X, M and n are respectively the same as those shown before, and m is the degree of condensation of the condensate of the respective aldehydes.

As is seen in the above-mentioned formulae, the oxygen presumably generated from the caustic alkali is removed from the reaction system by forming water, and the small amount of water (2 mols per one mole of sulfur) thus produced is considered not to inhibit the polymerization nor decompose the polymer or the solvent, but, on the contrary, to prevent the decomposition of the polymer or the solvent effectively. In addition, as are seen in the above-mentioned reaction formulae (i) and (ii), all the starting materials of the present process are anhydrous and no water is added from outside. Accordingly, there is no necessity of having a troublesome step of dehydration in the present step, and it is one of the characteristics of the present invention.

Further, carbon dioxide (generated in (i)) and carboxylic acid (acetic acid, generated in (ii)) are respectively transformed into carbonate salt and carboxylate salt, and the presence of such a salt in the reaction system according to the present invention is considered effective in raising the degree of polymerization of the product, the aromatic sulfide polymer.

In addition, according to the present process, particularly in the case of (ii), since the amount of formation of the carbonate salt is relatively small not enough to raise the viscosity of the reaction system too much, even in the case where the concentration of the starting materials to be charged in the reaction system if fairly high, the polymerization proceeds smoothly to obtain the product in a fairly large amount. In other words, the capacity of the apparatus for polymerization may be raised to an extent by raising the concentration of the charged starting materials.

The present invention will be explained more in detail as follows.

As the elementary sulfur which is one of the starting materials of the present process, any one of rhombic sulfur, monoclinic sulfur and amorphous sulfur may be used, and for the purpose of maintaining the close contact thereof with the other reactants in the reaction system to carry out the reaction smoothly, it is preferable to use a fine powdery sulfur.

As the polyhalogen-substituted aromatic compound which is also one of the starting materials of the present process, the compound represented by any one of the following general formulae may be used:

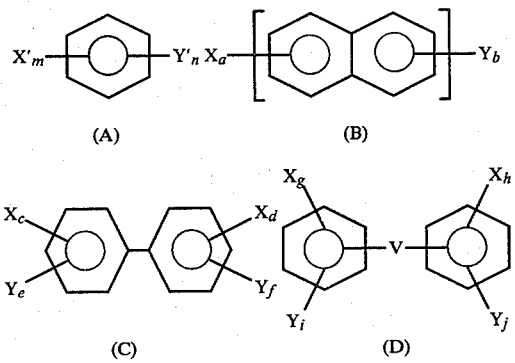

wherein X is a halogen atom, preferably chlorine or bromine; Y represents —R, —OR or —COOR wherein R is a member selected from the group consisting of a hydrogen atom, alkyl groups, cycloalkyl groups, aryl groups and aralkyl groups; V is a member selected from the group consisting of —O—, —S—, —SO—, —SO$_2$—,

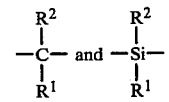

wherein $R^1$ and $R^2$ are the same or different and those selected from the group consisting of a hydrogen atom, alkyl groups, cycloalkyl groups, aryl groups and aralkyl groups and m', n', a, b, c, d, e, f, g, h, i and j represent respectively a positive integer or zero defined by the following conditions. $2 \leq m' \leq 6$, $0 \leq n' \leq 4$, $2 \leq a \leq 8$, $0 \leq b \leq 6$, $1 \leq c$, $5 \geq d$, $0 \leq e$, $4 \geq f$, $1 \geq g$, $5 \geq h$, $0 \leq i$ and $4 \geq j$.

Of the compounds represented by any one of the abovementioned general formulae, those having 2 or 3 halogen atoms are preferable, and of them, those having 2 halogen atoms are particularly preferable. Those which are preferable are exemplified as follows.

p-dichlorobenzene (referred to as p-DCS), m-dichlorobenzene (referred to as m-DCB), 1,2,4- and 1,3,5-trichlorobenzene (referred to as 1,2,4-TCB and 1,3,5-TCB), p-dibromobenzene, 1-methoxy-2,5-dichlorobenzene, 2,5-dichlorotoluene, 1,4-dichloronaphthalene, 4,4'-dichlorobiphenyl, 4,4'-dichlorodiphenyl ether (referred to as DCDPE), 3,5-dichlorobenzoic acid (referred to as DCBA), 3,3'-dichlorodiphenyl sulfone (referred to as DCDPS), 3,3'-dichlorodiphenyl sulfoxide and 3,3'-dichlorodiphenyl sulfide. Particularly, it is suitable to use p-DCB, m-DCB, 1,2,4-TBC, 1,3,5-TCB and 3,3'-DCDPS in the present process owing to the properties of the respective products for use.

As the reductant used as a scavenger of the aforementioned oxygen generated in the reaction system, formaldehyde, glyoxal, aldehydes represented by the general formula: $R^3$—CHO wherein $R^3$ represents an alkyl-, aryl- or aralkyl group or the condensates thereof, for instance, acetaldehyde, propionaldehyde, butyraldehyde, benzaldehyde, paraformaldehyde (referred to as PFA), trioxane (referred to TOX), polyoxymethylene (referred to as POM), paraacetaldehyde and metaacetaldehyde may be used.

From the view point of handling in operation, the condensates of aldehyde are preferable and of the condensates, paraformaldehyde is particularly preferable because of the smooth proceeding of the polymerization in the case of using thereof.

As the caustic alkali used in the present process for scavenging carbon dioxide generated in the reaction, a hydroxide of an alkali metal, preferably that of rubidium, lithium, potassium or sodium may be used.

The form of the caustic alkali used in the present process is preferably fine powdery for maintaining the close contact thereof with the other reactants during the reaction, particularly with carbon dioxide generated in the reaction system.

As the medium for the polymerization of the present process an organic solvent which can dissolve completely or partially the whole amount of elementary sulfur, the polyhalogen-substituted aromatic compound, the aldehyde or the condensate thereof and the caustic alkali and has not any active hydrogen may be used, the active hydrogen herein mentioned being the hydrogen atom which is bonded to oxygen, nitrogen or the like in the solvent molecule.

An acid amide such as dimethylacetamide (referred to as DMA) and hexamethyl phosphoric triamide (referred to as HMPA), N-methylpyrrolidone (referred to as NMP), tetramethylurea (referred to as TMU), an etherified polyethylene glycol such as polyethylene glycol dialkyl ether, a sulfoxide such as tetramethylene sulfoxide may be used in the present process as the organic solvent. Among them, HMPA, NMP and DMA are particularly preferable because of the high chemical stability thereof.

The amount of the organic solvent used in the present process preferably ranges from 0.02 to 5 liters per gram-equivalent of elementary sulfur. In the case of over 5 liters, the concentration of the reactants is so low that the reaction velocity is too low for the purpose, and on the other hand, in the case of below 0.02 liter, the dissolution of the reactants into the solvent is unsufficient for the smooth proceeding of the polymerization.

The relative amounts of the respective reactants are one gram-equivalent of elementary sulfur, 0.7 to 1.3 preferably 0.8 to 1.2 gram-equivalents of the polyhalogen-substituted aromatic compound, 0.6 to 1.4, preferably 0.8 to 1.2 gram-equivalents of the aldehyde or the condensate thereof and 1.2 to 2.5, preferably 1.4 to 1.6 gram-equivalents of the caustic alkali, wherein the calculation is carried out on the basis that one mole of formaldehyde corresponds to 4 gram-equivalents of formaldehyde, and one mole of other aldehyde than formaldehyde corresponds to 2 gram-equivalents of the aldehyde.

In the case where the amount of any of the reactants deviates from the above-mentioned range, the excess of amount of certain reactant possibly inhibits the normal proceeding of the polymerization.

The reaction temperature is preferably in a range of 100° to 300° C., and in the case of below 100° C., the reaction velocity is very low and not favorable from the economical veiwpoint, and, on the other hand, in the case of over 300° C., there is a possibility of the occurrence of abnormal reaction of the solvent, the polymer, etc. Particularly favorable reaction temperature is in a range of 150° to 280° C.

In the present process, the conventional system of polymerization such as batch system or continuous system can be adopted, and in batch system, a divided charge system wherein the total amounts of the respective reactants to be charged are divided into portions having the same composition and each portion is charged one after another is applicable. The merit of the divided charge system in polymerization is the ease of controlling the heat of polymerization.

In addition, as has been stated, since in the present process, anhydrous starting materials are used, any dehydration step which is necessary in the case of using sodium sulfide nonanhydrate is not necessary, and such a process not accompanying the dehydration step is energetically economic.

The atmosphere in the system of the present process is preferably non-oxidative, and it is preferable to displace the air within the reaction system with an inert gas such as nitrogen and argon in advance of starting the reaction.

The thus formed polymeric substance is collected after the polymerization is over by the steps of precipitation of the solid products such as the polymer and inorganic salts with the addition of a solvent such as water, ethers, halohydrocarbons, aromatic hydrocarbons, aliphatic hydrocarbons, etc. as a precipitant, filtration of the precipitated solids, washing and drying the filtered substances. As another method of collecting the polymeric substance, the reaction mixture is heated under a reduced pressure or a norma, pressure after the reaction is over to distill only the solvent, and after washing the remaining residual solid materials with a solvent such as water, ketones, alcohols, aromatic hydrocarbons, halogenohydrocarbons, ethers etc., the washed material is neutralized, filtered and dried to obtain the polymer.

It is possible to obtain a branched polymer and a copolymer including more than two kinds of reaction units by suitable selection and combination of a plurality of polyhalogen substituted aromatic compounds. For instance, in the case of using dichlorobenzene with a combination of a some amount of trichlorobenzene, branched polymer of phenylene sulfide can be obtained. In the case of using p-dichlorobenzene, m-dichlorobenzene, or p, p'-dichlorodiphenyl sulfone in combination, the following copolymer containing the units such as

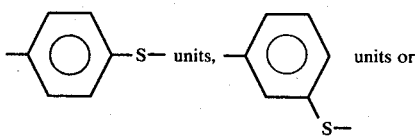

$-\phi-SO_2-\phi-$ units 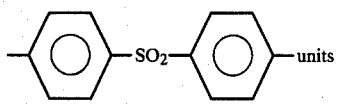

can be obtained.

Further, by adding a small amounts of Cl$\phi$COOH, Cl$\phi$COOM, Cl$\phi$OH, etc. (herein $\phi$ meaning an aryl group) in the last stage of the polymerization, it is possible to produce the polymer having —COOH group, —COOM group, —OH group at the terminal of the polymer molecule.

In addition, by adding the above-mentioned compound such as trichlorobenzene, etc. a sulfide polymer of a high molecular weight is obtained, and such a polymer of a high molecular weight is also obtained by adding an alkali metal salt of a carboxylic acid in advance of polymerization in the system.

The polymers obtained by the present process can be molded into various useful articles by the known molding techniques. The suitable molding technique includes injection molding, press molding, extrusion molding, rotation molding and the like.

The thus molded articles may be converted into the shaped articles resistant to a higher temperature by curing thereof.

The polymer according to the present invention can be admixed with a powdery filler such as carbon black, powdery calcium carbonate, powdery silica, powdery titanium oxide, etc. or a fibrous filler such as carbon fiber, glass fiber, asbestos, a polyamide fiber and the thus obtained mixture may be subjected to molding.

Also at least one synthetic resin such as polycarbonate, polyphenylene oxide, polysulfone, polyarylene, polyacetal, polyimide, polyamide, polyester, polystyrene, a terpolymer of acrylonitrile, butadiene and styrene, etc. may be admixed with the polymer, and the mixture may be molded.

The present invention will be explained more in detail while referring to the following non-limitative examples:

EXAMPLES 1 to 30

Polymerization According to the Present Process

Polymerization of Examples 1 to 27 was carried out in a stainless-steel (grade of SUS 304 of Japanese Industrial Standards) autoclave of a capacity of 500 ml provided with an electromagnetic stirrer, and polymerization of Examples 28 to 30 was carried out in a stainless steel (SUS 304) autoclave of a capacity of 20 liters provided with an electromagnetic stirrer.

After introducing the starting material shown in Table 1 into the autoclave, the aerial space was replaced by gaseous nitrogen as completely as possible and still under a pressure of 1 to 2 atoms of nitrogen the autoclave was closed, and the content of the autoclave was heated to a predetermined temperature shown also in Table 1 for a predetermined time period to carry out the polymerization while stirring the content of the autoclave. After the reaction was over, the autoclave was cooled to room temperature and opened to take out the reaction mixture, to which water was added to precipitate the polymer.

The thus precipitated polymer was collected by filtration, washed three times with water and one with acetone, and dried at 70° C. for one day. Only in the cases where homopolymer or copolymer of dichlorodiphenylsulfone was produced as in Examples 22 and 23, the polymer was once washed with methanol instead of acetone.

The yield of polymerization was calculated on the weight of the thus collected polymer based on the charged amount of elementary sulfur and shown also in Table 1, wherein the amount of the polyhalogen-substituted aromatic compound represented by gram-equivalent is the value obtained by calculation on the basis that the amount of a polyhalogen-substituted aromatic compound corresponds to the amount of one mole of the compound divided by the number of halogen atoms in the compound.

The relationship between the amount of an aldehyde represented by moles and that represented by gram-equivalent is as follows.

One mole of formaldehyde corresponds to 4 gram-equivalents of formaldehyde, and one mole of other aldehydes than formaldehyde corresponds to 2 gram-equivalents of the aldehyde.

The melt-viscosity of each of the polymers is the value obtained by the determination while using a "KO-KA"-type flowtester under the conditions of 300° C. and a load of 10 kg/cm$^2$.

TABLE 1

| Item | Example 1 | Example 2 | Example 3 | Example 4 |
|---|---|---|---|---|
| Sulfur (g-equivalent) | 1.26 | 1.26 | 1.68 | 1.68 |
| Polyhalogen-substituted aromatic compound (g-equivalent) | p-DCB 1.22 | p-DCB 1.22 and 1,2,4-TCB 0.006 | p-DCB 1.63 | p-DCB 1.62 and 1,2,4-TCB 0.008 |
| Reducant (g-equivalent) | PFA 1.20 | PFA 1.20 | PFA 1.62 | PFA 1.60 |
| Caustic alkali (g-equivalent) | NaOH 1.89 | NaOH 1.90 | NaOH 2.52 | NaOH 2.55 |
| Solvent (ml) | NMP 400 | NMP 400 | NMP 400 | NMP 400 |
| Temperature (°C.) | 240 → 260 | 260 | 240 → 260 | 220 |
| Reaction Time (hr) | 0.5 \ 0.5 | 2 | 2 \ 1 | 24 |
| Yield of polymer (%) | 92.5 | 94.0 | 94.1 | 95.3 |
| Appearance of polymer | grayish white powder | grayish white powder | grayish white powder | grayish white powder |

| Item | Example 5 | Example 6 | Example 7 | Example 8 |
|---|---|---|---|---|

TABLE 1-continued

| | | | | |
|---|---|---|---|---|
| Sulfur (g-equivalent) | 1.68 | 1.68 | 1.26 | 2.10 |
| Polyhalogen-substituted aromatic compound (g-equivalent) | p-DCB 1.63 | p-DCB 1.62 and 1,3,5-TCB 0.008 | p-DCB 1.22 | p-DCB 2.03 and 1,3,5-TCB 0.01 |
| Reductant (g-equivalent) | PFA 1.60 | PFA 1.60 | PFA 1.20 | PFA 2.00 |
| Caustic alkali (g-equivalent) | NaOH 2.63 | NaOH 2.52 | NaOH 2.00 | NaOH 3.15 |
| Solvent (ml) | NMP 400 | NMP 400 | NMP 400 | NMP 400 |
| Temperature (°C.) | 230 | 210 | 160 | 160 → 180 → 210 |
| Reaction Time (hr) | | | | 14, 14, 12 |
| Yield of polymer (%) | 95.0 | 96.3 | 81.7 | 99.2 |
| Appearance of polymer | grayish white powder | grayish white powder | grayish white powder | grayish white powder |
| Melt viscosity (poise) | | 88 | | |

| | Example | | | |
|---|---|---|---|---|
| Item | 9 | 10 | 11 | 12* |
| Sulfur (g-equivalent) | 1.68 | 1.68 | 1.68 | 0.84 × 2 |
| Polyhalogen-substituted aromatic compound (g-equivalent) | p-DCB 1.60 | p-DCB 1.60 and 1,2,4-TCB 0.016 | p-DCB 1.60 | p-DCB 0.84 × 2 |
| Reductant (g-equivalent) | PFA 1.60 | PFA 1.60 | PFA 1.60 | PFA 0.80 × 2 |
| Caustic alkali (g-equivalent) | NaOH 2.52 | NaOH 2.60 | NaOH 2.52 | NaOH 1.26 × 2 |
| Solvent (ml) | NMP 400 | NMP 400 | NMP 400 | NMP 400 |
| Temperature (°C.) | 160 → 210 | 200 | 200 | 210 → 210 |
| Reaction Time (hr) | 20, 20 | 22 | 42 | 18, 18 |
| Yield of polymer (%) | 98.9 | 87.2 | 94.8 | 92.2 |
| Appearance of polymer | grayish white powder | grayish white powder | graysih white powder | grayish white powder |

| | Example | | | |
|---|---|---|---|---|
| Item | 13 | 14 | 15 | 16 |
| Sulfur (g-equivalent) | 1.68 | 1.68 | 1.68 | 1.68 |
| Polyhalogen-substituted aromatic compound (g-equivalent) | p-DCB 1.62 and 1,3,5-TCB 0.008 | p-DCB 1.63 | p-DCB 1.63 | p-DCB 1.63 |
| Reductant (g-equivalent) | POM 1.60 | TOX 1.60 | p-aldehyde 1.60 | m-aldehyde 1.60 |
| Caustic alkali (g-equivalent) | NaOH 2.60 | NaOH 2.52 | NaOH 2.55 | NaOH 2.52 |
| Solvent (ml) | NMP 400 | NMP 400 | NMP 400 | NMP 400 |
| Temperature (°C.) | 210 | 200 | 200 | 200 |
| Reation Time (hr) | 21 | 17 | 17 | 22 |
| Yield of polymer (%) | 81.2 | 74.7 | 75.5 | 72.9 |
| Appearance of polymer | white powder | white powder | pale grey powder | pale brown powder |

| | Example | | | |
|---|---|---|---|---|
| Item | 17 | 18 | 19 | 20 |
| Sulfur (g-equivalent) | 1.68 | 1.26 | 1.68 | 1.68 |
| Polyhalogen-substituted aromatic compound (g-equivalent) | p-DCB 1.62 and 1,2,4-TCB 0.008 | p-DCB 1.22 | p-DCB 1.63 | p-DCB 1.63 |
| Reductant (g-equivalent) | Benzaldehyde 1.60 | PFA 1.20 | PFA 1.60 | PFA 1.60 |
| Caustic alkali (g-equivalent) | NaOH 2.52 | KOH 1.90 | NaOH 2.52 | NaOH 2.52 |
| Solvent (ml) | NMP 400 | NMP 400 | HMPA 400 | DMA 100 + 300 |
| Temperature (°C.) | 180 → 250 | 210 | 240 | 160 |
| Reaction Time (hr) | 20, 20 | 16 | 4 | 66 |
| Yield of polymer (%) | 85.0 | 69.3 | 99.0 | 71.9 |
| Appearance of polymer | pale brown powder | pale brown powder | grayish white powder | grayish white powder |

TABLE 1-continued

| | Example | | | | |
|---|---|---|---|---|---|
| Item | 21 | 22 | 23 | 24 | 25 |
| Sulfur (g-equivalent) | 1.26 | 1.26 | 1.26 | 1.68 | 1.26 |
| Polyhalogen-substituted aromatic compound (g-equivalent) | p-DCB 1.08 and m-DCB 0.12 | p-DCB 1.08 and DCDPS 0.12 | p-DCB 1.20 | p-DCB 1.43 and s,4-DCT 0.20 | p-DCB 1.20 |
| Reductant (g-ewquivalent) | PFA 1.20 | PFA 1.20 | PFA 1.20 | PFA 1.60 | PFA 1.20 |
| Caustic alkali (g-equivalent) | NaOH 1.90 | NaOH 2.00 | NaOH 2.00 | NaOH 2.52 | NaOH 1.90 |
| Solvent (ml) | NMP 400 | NMP 400 | NMP 400 | NMP 400 | NMP 400 |
| Temperature (°C.) | 160 → 210 | 160 → 210 | 160 | 240 | 220 |
| Reaction Time (hr) | 20 \ 20 | 20 \ 20 | 20 | 10 | 4 |
| Yield of polymer (%) | 86.0 | 86.3 | 77.7 | 70.1 | 93.2 |
| Appearance of polymer | grayish white powder | pale yellow powder | Pale brown powder | white powder | white powder |

| | Example | | | | |
|---|---|---|---|---|---|
| Item | 26 | 27 | 28 | 29 | 30* |
| Sulfur (g-equivalent) | 1.26 | 1.26 | 28.0 | 28.0 | 28.0 |
| Polyhalogen-substituted aromatic compound (g-equivalent) | p-DCB 1.02 and 4,4'-DCDPE 0.20 | p-DCB 1.20 and 3,5-DCBA 0.03 | p-DCB 28.0 | p-DCB 28.0 and 1,2,5-TCB 0.14 | p-DCB 28.0 |
| Reductant (g-equivalent) | PFA 1.20 | PFA 1.20 | PFA 28.0 | PFA 28.0 | PFA 28.0 |
| Caustic alkali (g-equivalent) | NaOH 1.90 | NaOH 1.92 | NaOH 42.0 | NaOH 42.0 | NaOH 42.0 |
| Solvent (ml) | HMPA 400 | NMP 400 | NMP 14000 | NMP 14000 | NMP 14000 |
| Temperature (°C.) | 240 | 220 | 210 → 220 | 210 → 220 | 210 → 220 |
| Reaction Time (hr) | 10 | 18 | 3 \ 7 | 3 \ 5 | 3 \ 7 |
| Yield of polymer (%) | 89.0 | 92.1 | 95.3 | 98.4 | 97.8 |
| Appearance of polymer | white powder | white powder | grayish white powder | graysih white powder | white powder |
| Melt viscosity (poise) | | | 41 | 125 | 58 |

(Note)
In Example 12, the starting materials were divided in the two equal portions and the charge was carried out two times with each portion.
In Example 30, the reaction was carried out in the presence of 28 mol of anhydrous sodium acetate.

COMPARATIVE EXAMPLES 1 to 6

Comparative Examples 1 and 2 correspond respectively to Example 6,. Comparative Example 3 corresponds to Example 18 and Comparative Examples 4, 5 and 6 respectively correspond to Examples 28, 29 and 30.

Conditions for polymerization in Comparative Examples are shown in Table 2.

In the case of Comparative Example 1 wherein no aldehyde was present in the reaction system, the concurrence of decomposition was recognized and the yield of polymer was far lower than that in Example 6 with the polymer of very low in melt viscosity.

In the case of Comparative Example 2 wherein no aldehyde was present in the reaction system and sodium carbonate was used instead of sodium hydroxide, the yield of polymer was very low.

In the case of Comparative Example 3 wherein potassium sulfide was used instead of the combination of sulfur, aldehyde and potassium hydroxide, the polymer was scarcely formed.

In the case of Comparative Examples 4 and 5 wherein no aldehyde was present in the reaction system, the concurrence of decomposition was recognized and the yield of the polymer was far lower than that in Examples 28 and 29 with the polymer of very low in melt viscosity.

In the case of Comparative Example 6 wherein no aldehyde was present in the reaction system, the yield of the polymer was very low with the polymer of very low in melt viscosity even in the presence of sodium acetate.

TABLE 1

| | Comparative Example | | | | | |
|---|---|---|---|---|---|---|
| Item | 1 | 2 | 3 | 4 | 5 | 6 |
| Sulfur (g-equivalent) | 1.68 | 1.68 | K₂S 1.26 | 28.0 | 28.0 | 28.0 |
| Polyhalogen-substituted aromatic compound (g-equivalent) | p-DCB 1.62 and 1,3,5-TCB 0.008 | p-DCB 1.62 and 1,3,5-TCB 0.008 | p-DCB 1.22 | p-DCB 28.0 | p-DCB 28.0 and 1,3,5-TCB 0.14 | p-DCB 28.0 |
| Reductant (g-equivalent) | none | none | none | none | none | none |

TABLE 1-continued

| Item | Comparative Example | | | | | |
|---|---|---|---|---|---|---|
| | 1 | 2 | 3 | 4 | 5 | 6 |
| Caustic alkali | NaOH | Na$_2$CO$_3$ | none | NaOH | NaOH | NaOH |
| (g-equivalent) | 2.52 | 2.52 | | 42.0 | 42.0 | 42.0 |
| Solvent | NMP | NMP | NMP | NMP | NMP | NMP |
| (ml) | 400 | 400 | 400 | 14000 | 14000 | 14000 |
| Temperature (°C.) | 210 | 210 | 210 | 210 → 220 | 210 → 220 | 210 → 220 |
| Reaction Time (hr) | 40 | 40 | 16 | 3 / 7 | 3 / 5 | 3 / 7 |
| Yield of polymer (%) | 63.0 | 15.0 | almost zero | 64.5 | 67.1 | 69.1 |
| Appearance of polymer | dark brown powder | dark brown powder | dark brown powder | dark brown powder | dark brown powder | dark brown powder |
| Melt viscosity (poise) | about 1 | less than 1 | | about 1 | about 2 | about 2 |

What is claimed is:

1. A process for producing an aromatic sulfide polymer, comprising the step of
reacting one gram-equivalent of elementary sulfur, 0.7 to 1.3 gram-equivalents of a polyhalogen-substituted aromatic compound, 0.6 to 1.4 gram-equivalents of an aldehyde or a condensate thereof and 1.2 to 2.5 gram-equivalents of a caustic alkali in 0.02 to 5 liters of an organic solvent at a temperature of 100° to 300° C.

2. A process according to claim 1, wherein one gram-equivalent of elementary sulfur, 0.8 to 1.2 gram-equivalents of said polyhalogen-substituted aromatic compound, 1.4 to 1.7 gram-equivalents of said caustic alkali are reacted in 0.02 to 5 liters of said organic solvent at a temperature of 150° to 280° C.

3. A process according to claim 1 or 2, wherein said elementary sulfur is rhombic sulfur, monoclinic sulfur or amorphous sulfur.

4. A process according to claim 1, wherein said polyhalogen-substituted aromatic compound is a member selected from the group consisting of dichlorobenzenes, dibromobenzenes, trichlorobenzenes, 1-methoxy-2,5-dichlorobenzene, 2,5-dichlorotoluene, 1,4-dichloronaphthalene, 4,4'-dichlorobiphenyl, 4,4'-dichlorodiphenyl ether, 3,5-dichlorobenzoic acid, 3,3'-dichlorodiphenyl sulfone, 3,3'-dichlorodiphenyl sulfoxide and 3,3'-dichlorodiphenyl sulfide.

5. A process according to claim 1, wherein said aldehyde or said condensate thereof is a member selected from the group consisting of formaldehyde, acetaldehyde, propionaldehyde, butyraldehyde, benzaldehyde, paraformaldehyde, trioxane, polyoxymethylenes, paraacetaldehyde and metaacetaldehyde.

6. A process according to claim 1, wherein said organic solvent is a member selected from the group consisting of hexamethyl phosphoric triamide, N-methyl-pyrrolidone, tetramethyl-urea, dimethylacetamide and tetramethylene sulfoxide.

* * * * *